Figure 1:
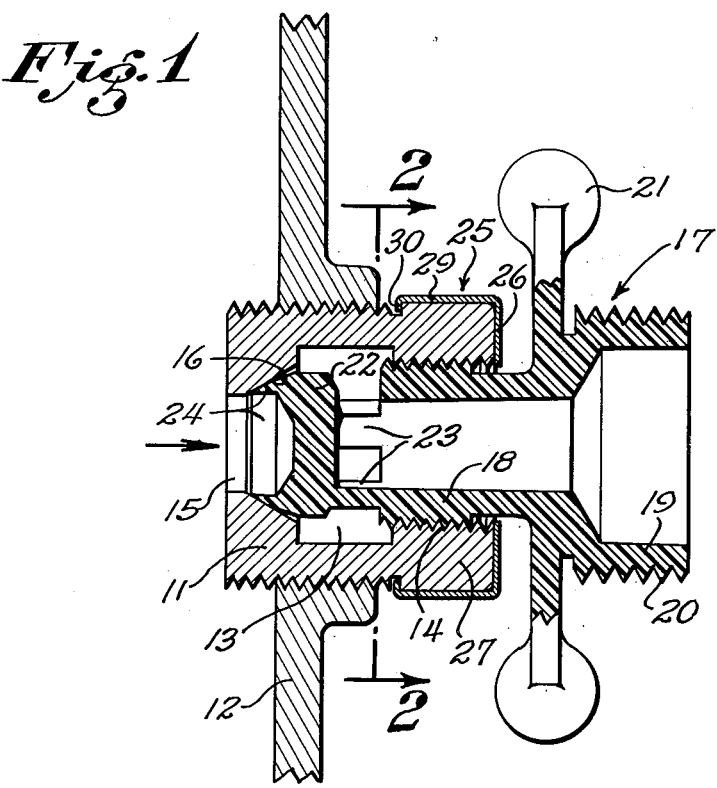

May 23, 1961 R. D. GRAYSON 2,985,180
DRAIN VALVE
Filed Jan. 27, 1958

INVENTOR,
RICHARD D. GRAYSON
BY
John H. Rouse,
ATTORNEY.

2,985,180
DRAIN VALVE

Richard D. Grayson, La Canada, Calif., assignor to General Controls Co., Glendale, Calif., a corporation of California Filed Jan. 27, 1958, Ser. No. 711,425

2 Claims. (Cl. 137—74)

This invention relates to manually operable valves, and more particularly to improvements in drain valves for water-storage tanks of domestic water-heaters.

One object of this invention is to provide a drain valve of the character described which is so constructed that, when the valve is closed, the pressure of the water acts on the valve closure to maintain the same seated.

Another object of the invention is to provide a drain valve for a hot-water tank wherein the value closure is of thermoplastic material capable of withstanding the normal temperature of the hot water, but which softens sufficiently at an abnormally high temperature to deform under the pressure of the water and permit escape of water through the valve, so that possible explosion of the tank is avoided. A supplemental object is to facilitate unseating of the valve closure under abnormally high temperature and pressure conditions by providing a weekened connection between the valve closure and its operating means.

Another object is to provide a drain valve which consists essentially of only two parts: (1) an elongated body having an axial passage therethrough and providing a valve seat around the passage, and (2) an elongated valve member screw-threaded in the passage and cooperable with said seat, the valve member having a discharge opening therethrough.

Another object is to provide a drain valve, of the character described in the preceding object, wherein the valve member is of one-piece construction and molded of organic plastic material. An additional object is to construct this valve member so that, when the valve is closed, the pressure of the water acts on the member to prevent leakage of the water despite such deformation (or "cold flow") of the plastic material that may occur under normal temperature and pressure conditions.

Further objects and advantages of the invention will become apparent from the following description and accompanying drawing, and from the appended claims.

Figure 2:
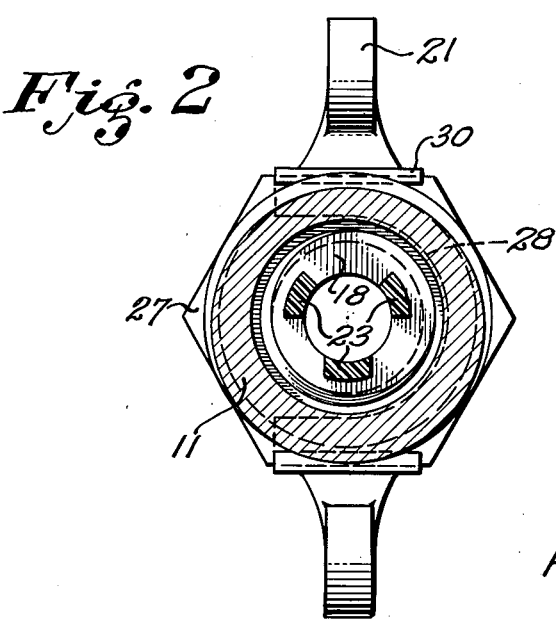

In the drawing:

Figure 1 is a longitudinal sectional view of a valve structure embodying this invention; and Figure 2 is a transverse section taken along the line 2—2 of Fig. 1.

As shown in the drawing the drain valve of this invention comprises a body 11, conveniently made from hexagonal brass bar-stock, an end portion of which is round and screw-threaded for mounting the valve in an opening through a wall 12 which, it is to be assumed, forms a lower part of a hot-water tank.

The body 11 has an axial opening therethrough which is enlarged intermediate its ends to form a chamber 13, the wall of the opening at its right being screw-threaded as indicated at 14. The portion of the body-opening between its inlet end 15 and chamber 13 is tapered to provide a conical valve-seat 16.

Inside body 11 is a valve member, generally indicated at 17, of thermoplastic material such as nylon. This valve member has a tubular median portion 18 screw-threaded externally to cooperate with the screw-threads 14 of the body, and at its right-hand end an enlarged discharge portion 19 having screw-threads 20 for attachment of a drain hose if desired. Projecting radially from the portion 19 is a pair of handles 21 for turning the valve member.

At its left-hand end the valve member 17 has a closure portion or head 22 cooperable with the valve seat 16 and tapered to conform generally to the shape of the seat. The head 22 is joined to the tubular portion 18 of the valve member only by three spaced-apart arms 23 to provide communication between chamber 13 and the interior of this portion. The lower one of arms 23 (see Fig. 2) is of different shape for convenience of molding.

In the surface of head 22 exposed to the pressure of the water at the inlet of the valve body is a recess providing a circular wall 24 projecting from the head at its periphery. This wall is made quite thin so that, being of flexible plastic material, the pressure of the water acting on the inner surface of the wall when the valve is closed maintains the outer surface of the wall in tight engagement with the valve seat. Any tendency for the fit between these parts to become loose due to "cold flow" of the plastic material is thus avoided. The angle of taper of the head is preferably made slightly (say, 5°) less than that of the seat to ensure seating of the wall portion 24 of the head when the valve is closed.

To prevent accidental withdrawal of the valve member beyond its fully-open position there is a sheet-metal clip 25 having a vertical portion 26 abutting the end surface of the hexagonal part 27 of the valve body and provided with a U-shaped opening (indicated in Fig. 2 by the broken line 28) for the valve member, the margin of portion 26 around this opening being engageable by the screw-threads 14 on the valve member when the valve is opened fully. At the top and bottom of the vertical portion 26 of the clip are horizontal portions 29 overlying opposite sides of the hexagonal part of the body, the bent ends 30 of portions 29 cooperating with slots in the body to hold the clip in place.

In the event of abnormal rise of temperature and pressure of the water in the tank, as might be caused by a defective thermostatic control device, the closure head 22 will soften sufficiently to deform or yield under the pressure of the water and permit the water to escape through the valve, so that possible explosion of the tank is avoided. Movement of the closure head away from the seat under these abnormal conditions is facilitated by the weakened support provided by arms 23 for the head. In the event of rapid rise of temperature of the water the threaded portion of the valve member may soften sufficiently that the whole valve member is ejected from the body by the pressure of the water.

Thermoplastic material that softens appreciably at a temperature slightly below the boiling point of water is suitable for use in connection with this invention. The material nylon is one example of such material; however, it is apparent that there may be, or will be, other suitable thermoplastic materials.

In connection with the pressure-sealing effect produced by the flexible closure-wall 24, it is obvious that various organic plastic materials could be employed for that wall. However, by employing a material having a relatively low softening point, both the pressure-sealing and the safety (pressure relieving) features of the invention are achieved.

While desirable, it is not essential that both the closure head and the valve seat be conical as shown, since the pressure-sealing effect may be produced by an arrangement wherein the outer surface of closure-wall 24 is parallel to the axis of the passage and the seat is tapered as shown, or wherein the outer surface of wall 24 is tapered as shown and cooperates with a seat formed by the corner of a right-angled circular shoulder. What is essential is that the arrangement be such that there is a component of the water pressure urging the flexible closure-wall into engagement with the seat when the valve is closed.

It is apparent that the specific valve structure herein shown and described is susceptible of further modification without departing from the spirit of the invention, and I intend therefore that no limitation be placed on the invention except as defined by the scope of the appended claims.

I claim as my invention:

1. In a drain valve for a hot-water tank: a metallic valve body having a passage therein for the water; means around the wall of said passage forming a valve seat facing generally toward the outlet of the passage; and a movable valve member mounted in said body and having a closure portion engageable with said seat to close the valve, said closure portion having a substantial area of contact with the metallic body and a substantial area in direct contact with the water in the tank; said closure member being of thermoplastic material capable of withstanding the normal temperature of the hot water but which softens sufficiently at an abnormally high temperature to deform under the pressure of the water and permit escape of water through the valve, there being a weakened connection, of said thermoplastic material, between said closure portion and the remainder of the valve member for facilitating said deformation of the closure portion under the pressure of the water.

2. In a drain valve for a hot-water tank: a valve body having an axial passage therethrough; means around the wall of said passage, adjacent its inlet end, forming a valve seat facing generally toward the outlet end of the passage; and an elongated valve member threadedly mounted in the outlet end of the passage and having a closure head movable into and out of operative engagement with said seat when the valve member is turned; there being a space for flow between said head and the wall of the passage when the head is out of engagement with the seat; the portion of the valve member in the outlet end of the passage having a discharge opening therethrough communicating with said space; said closure head being of thermoplastic material capable of withstanding the normal temperature of the hot water but which softens sufficiently at abnormally high temperature to deform under the pressure of the water and permit escape of water through the valve; said valve body being made from material having a higher melting point than the material of the valve member; there being a weakened connection, of said thermoplastic material, between said closure head and the remainder of the valve member for facilitating said deformation of the closure head under the pressure of the water.

References Cited in the file of this patent

UNITED STATES PATENTS

| | | |
|---|---|---|
| 2,147,332 | Cornelius | Feb. 14, 1939 |
| 2,523,864 | Delany | Sept. 26, 1950 |
| 2,804,279 | Gould | Aug. 27, 1957 |
| 2,833,512 | Sanborn | May 6, 1958 |
| 2,859,771 | Blagg | Nov. 11, 1958 |
| 2,859,932 | Mackal | Nov. 11, 1958 |
| 2,865,596 | Monnig | Dec. 23, 1958 |
| 2,911,185 | Langdon | Nov. 3, 1959 |

FOREIGN PATENTS

| | | |
|---|---|---|
| 76,231 | Germany | of 1894 |
| 363,161 | France | of 1906 |
| 622,336 | France | of 1927 |
| 898,646 | France | of 1945 |
| 1,110,507 | France | of 1955 |
| 1,136,267 | France | of 1957 |